United States Patent [19]

Euteneuer et al.

[11] 4,331,260

[45] May 25, 1982

[54] SLIDE MOUNTER WITH SLIDE SEPARATOR/OUT-OF-SLIDE INHIBITOR

[75] Inventors: Charles L. Euteneuer, St. Michael; Armer J. Willenbring, Bloomington, both of Minn.

[73] Assignee: Pako Corporation, Minneapolis, Minn.

[21] Appl. No.: 152,023

[22] Filed: Aug. 15, 1980

[30] Foreign Application Priority Data

Jun. 6, 1980 [DE] Fed. Rep. of Germany ....... 3021441

[51] Int. Cl.[3] ........................ B65H 7/04; B65G 59/06

[52] U.S. Cl. ........................................ 221/19; 53/250; 53/520; 221/251

[58] Field of Search ................. 53/249, 250, 505, 506, 53/520, 67; 221/13, 14, 19, 251; 271/134, 136, 166

[56] References Cited

U.S. PATENT DOCUMENTS

| | | | |
|---|---|---|---|
| 2,808,961 | 10/1957 | Gabrielsen et al. | 221/14 |
| 3,341,960 | 9/1967 | Florjancic et al. | 40/152 |
| 3,470,642 | 10/1969 | Mundt et al. | 40/152 |
| 3,478,456 | 11/1969 | Mundt et al. | 40/152 |
| 3,524,299 | 8/1970 | Mundt et al. | 53/435 |
| 3,562,074 | 2/1971 | Mundt et al. | 156/580.1 |
| 3,570,342 | 3/1971 | Mundt | 83/93 |
| 3,614,854 | 10/1971 | Mundt et al. | 53/71 |
| 3,680,854 | 8/1972 | Daily et al. | 271/166 X |
| 3,709,355 | 1/1973 | Harrison | 221/14 X |
| 3,788,031 | 1/1974 | Florjancic | 53/520 |
| 3,807,121 | 4/1974 | Mundt et al. | 53/435 |
| 3,943,029 | 3/1976 | Mundt et al. | 156/443 |
| 3,977,280 | 8/1976 | Mundt et al. | 83/42 |
| 4,004,340 | 1/1977 | Urban | 29/417 |
| 4,135,343 | 1/1979 | Urban et al. | 53/435 |

OTHER PUBLICATIONS

"Pakon Consumer Slide Mounting Kits", Pako Corporation, Aug. 1975.

"Pakon Mount System", Pako Corporation, Jun. 1979.

"Operating Instructions for Semi-Automatic Mounters, Types 6001 and 7004", Aug. 1977.

*Primary Examiner*—Horace M. Culver

*Assistant Examiner*—Charles L. Willis

*Attorney, Agent, or Firm*—Kinney, Lange, Braddock, Westman and Fairbairn

[57] ABSTRACT

A slide mounter includes a magazine for holding a stack of slide frames. A slide ejector pushes the lowermost slide within the magazine out of the magazine and into a slide track, where the slide frame is opened to permit insertion of a film transparency. A slide separator separates the stack of slides into an upper stack above a predetermined level and a lower stack below the predetermined level within the magazine. An out-of-slides inhibitor connected to the slide separator prevents movement of the slide ejector when the slide separator moves to a position indicating that there are no further slides in the upper stack.

15 Claims, 3 Drawing Figures

22
20a
18"
111b
20
111a
112
114
18'
128
118
124
122
116a
110
100
94
116
142
132
140
138
116b
96
102
134
136
130
106
108
92
10
104

SLIDE MOUNTER WITH SLIDE SEPARATOR/OUT-OF-SLIDE INHIBITOR

BACKGROUND OF THE INVENTION

1. Field of the Invention

The present invention relates to photographic slide mounting apparatus.

2. Description of the Prior Art

Photographic slides are produced by mounting a photographic film transparency in a slide mount frame so that the image of the photographic transparency is aligned with the aperture of the frame. A variety of different types of mounting frames and mounting apparatus have been developed.

One particularly advantageous type of photographic slide mount is the Pakon slide mount, which is a one-piece plastic slide mount sold by Pako Corporation, the assignee of the present application. The film transparency is mounted by opening a film insertion slot in the slide mount by means of mounting equipment. The transparency slides into the mount and the mount is closed. The spring-like properties of the plastic slide mount material provides a safe and tight fit of the transparency in the slide mount without the need of welding or sealing.

U.S. patents showing slide mounts and slide mounting apparatus of this general type include the following U.S. Pat. Nos.: Florjancic et al 3,341,960, Mundt et al 3,470,642, Mundt et al 3,478,456, Mundt et al 3,524,299, Mundt et al 3,562,074, Mundt 3,570,342, Mundt et al 3,614,854, Florjancic 3,788,031, Mundt et al 3,807,121, Mundt et al 3,943,029, Mundt et al 3,977,280, Urban 4,004,340, Urban et al 4,135,343.

Apparatus has been developed for both manual and automatic mounting of transparencies in Pakon slide mounts. The manual mounting procedure utilizes a handheld mounting device into which the slide mount is inserted. By grasping the mount and the mounter together at one side, the film insertion opening is widened to permit insertion of a transparency in the slide mount. The transparency has previously been cut from a strip of photographic film containing many individual transparencies and is inserted manually into the slide mount.

While the hand mounting apparatus and procedure is adequate for mounting small quantities of transparencies in slide mounts, it clearly is not suitable for large-scale production of mounted transparencies as is required in professional photofinishing laboratories. The Pakon Slide Mounter sold by Pako Corporation is an automatic, motor-driven apparatus which mounts photographic film transparencies in Pakon slide mounts at rates of up to 160 slides per minute.

In some cases, however, the quantity of slides to be mounted by a photofinishing laboratory is not large enough to justify the use of automatic slide mounting apparatus such as the Pakon Slide Mounter, yet is greater than that which can be efficiently performed manually. To meet this need, semi-automatic slide mounters have been developed, such as the Type 6001 and 7004 slide mounters developed by Geimuplast Peter Mundt KG. These semi-automatic slide mounters operate generally in a similar manner to the automatic Pakon Slide Mounter, but are driven by an operating handle which is moved by the operator, rather than being motor driven.

The Type 6001 and 7004 semi-automatic slide mounters are operated by moving the operating lever along a closed path through an operating cycle. During this cycle, the following five functions are performed. First, an insertion slot in a slide mount is widened to receive the transparency. Second, the film strip is advanced and inserted into the mount. Third, the transparency is severed from the remainder of the film strip. Fourth, the transparency is inserted completely into the slide mount. Fifth, the mounter ejects the mounted slide.

These five functions form a complete mounting cycle. The home position of the operating lever occurs between the second and third functions. The path of the operating handle during an operating cycle begins with a first path portion in which the handle is moved downward from the home position. During this first path portion of the cycle, the knife cuts the transparency from the film strip. The second portion of the path of the operating handle is a movement toward the operator. During this second path portion, the transparency is inserted completely into the mount, a new mount is advanced out of a slide mount holder (magazine) and along a slide track so as to eject the mounted slide. As the new slide mount is advanced along the slide track, the insertion slot of the new mount is widened to receive another transparency from the film strip. The third portion of the path of the operating handle involves an upward movement of the handle which causes the film cutter blade to be retracted. During the fourth and final portion of the path, the operating handle is moved away from the operator and back to the home position. During this fourth path portion, the film strip is advanced to insert a transparency at the end of the film strip into the slide mount.

SUMMARY OF THE INVENTION

The present invention is an improved slide mounter apparatus of the type having a magazine for holding a plurality of slide frames and slide ejector means movable along a path for ejecting slide frames from the magazine into a slide track. The apparatus of the present invention includes slide separator means for separating slides above a predetermined level into an upper stack and below a level into a lower stack. This limits the amount of weight of the lower stack upon the slide being ejected. In addition, the present invention includes latch means operably linked to the slide separator means for preventing movement of the slide ejector means when no further slides are above the predetermined level. This prevents operation of the slide mounter when an out-of-slides condition occurs.

DETAILED DESCRIPTION OF THE PREFERRED EMBODIMENTS

Figure 1:
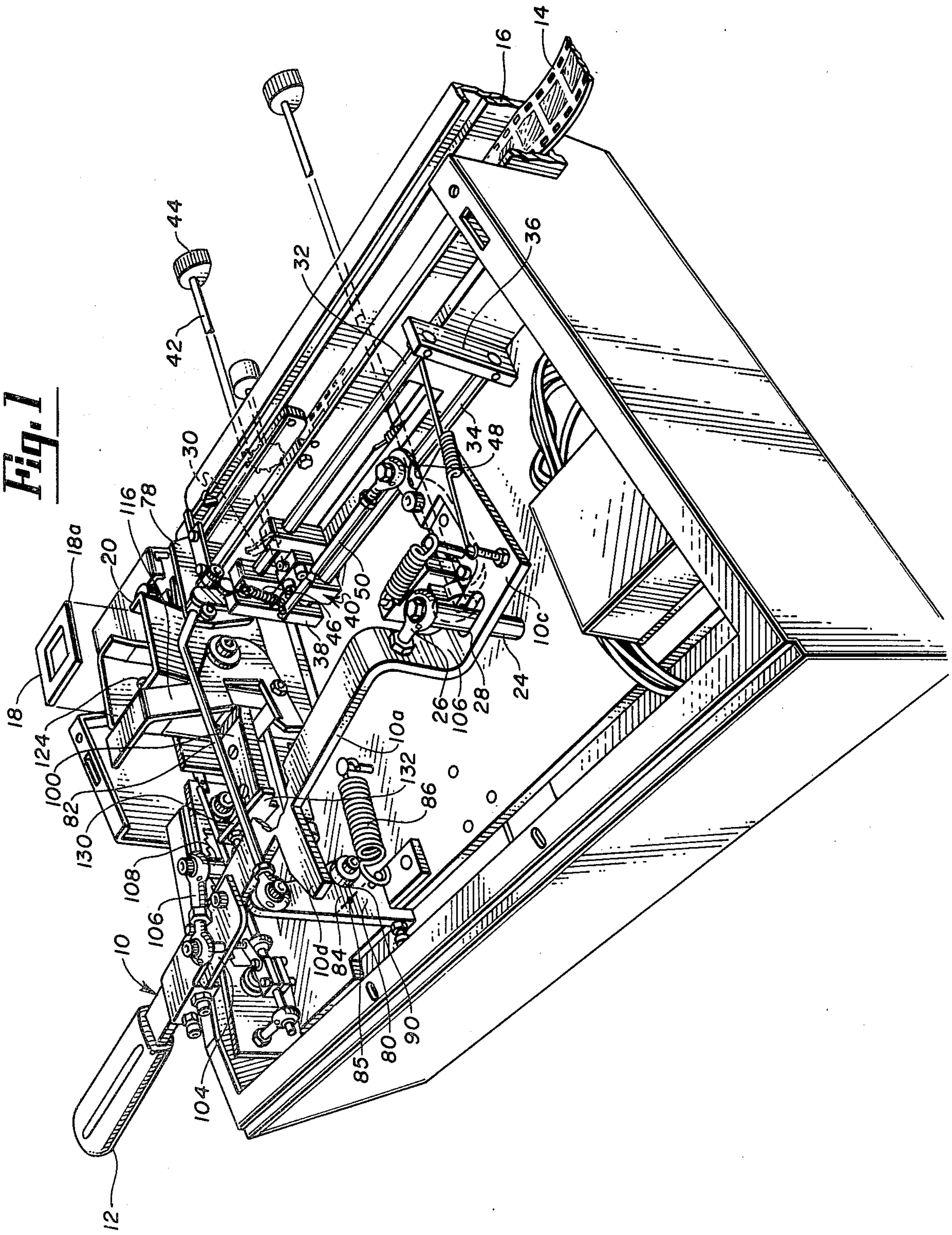
FIG. 1 is a pictorial view in perspective of the slide mounter of the present invention with top cosmetic cover removed.

FIG. 1 shows a semi-automatic slide mounter which utilizes the slide separator/out-of-slides mechanism of the present invention. The slide mounter shown in FIG.

1 is described in further detail in copending U.S. patent application Ser. No. 144,284 which is assigned to the same assignee as this application, and reference should be made to the copending application for a more detailed description of those parts of the slide mounter not forming a part of the present invention.

In the embodiment shown in FIG. 1, the slide mounter is actuated by operating lever 10, which has a handle 12 at its outer end. The operator grasps handle 12, and moves handle 12 (and lever 10) through a cycle generally similar to that described in the Background of the Invention with respect to the Type 6001 and 7004 semi-automatic slide mounters. The perspective view of the slide mounter shown in FIG. 1 is viewed from the left rear corner of the slide mounter. Lever 10 and handle 12 are shown in the "home position" in FIG. 1.

Figures 2, 3:
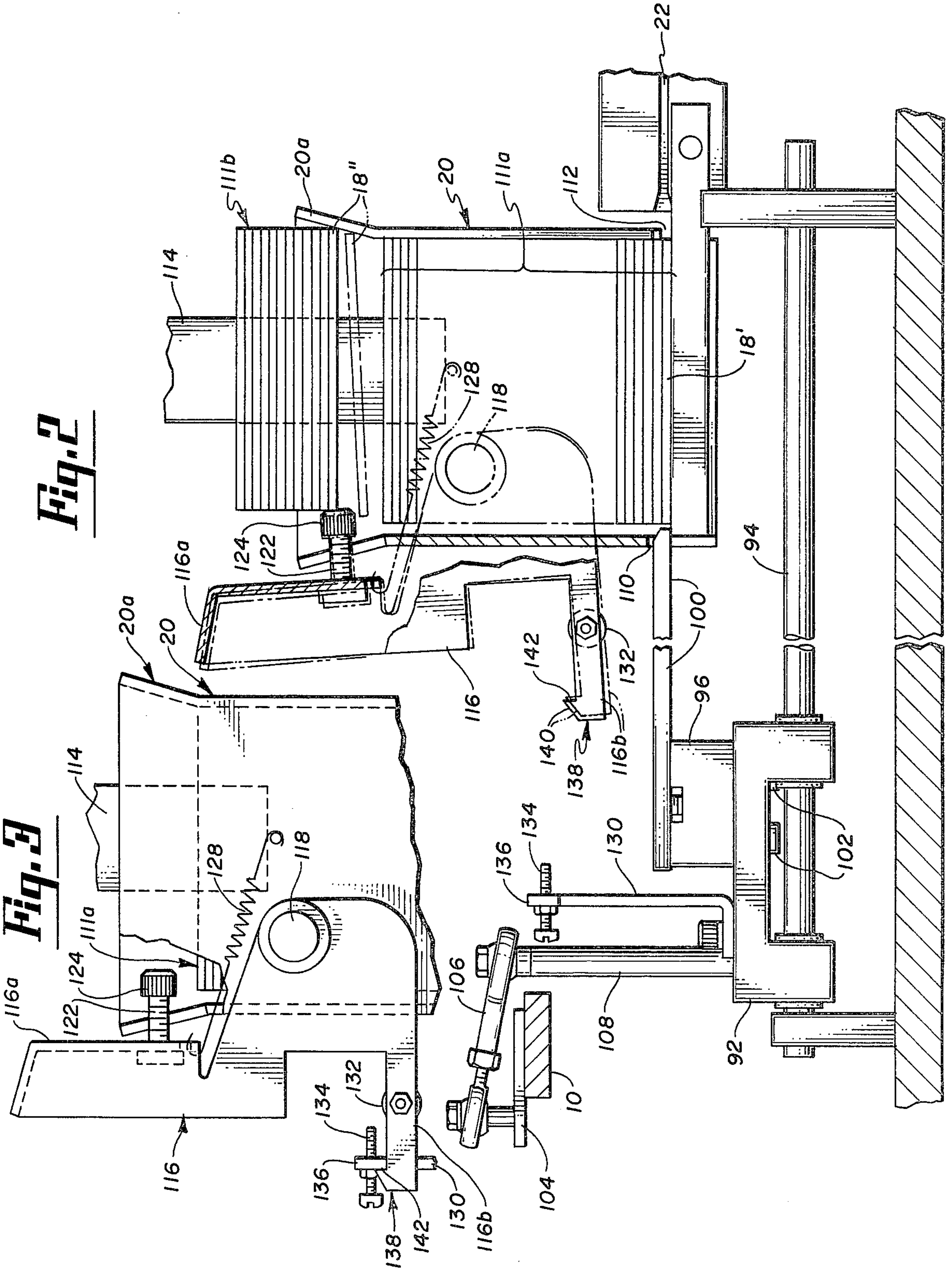
FIG. 2 is a sectional view of the slide advance mechanism of the slide mounter of FIG. 1 showing the slide separator/out-of-slides interlock mechanism of the present invention.
FIG. 3 is a sectional view of the slide separator/out-of-slides mechanism illustrating the mechanism when an "out-of-slides" condition occurs.

Operating lever 10 controls, through various linkage members, three major operating mechanisms of the slide mounter. The first mechanism is the film advance mechanism, which advances film web 14 along film track 16. The second mechanism is the knife actuating mechanism, which severs a transparency from the film web 14. The third mechanism is the slide advance mechanism, which advances slide mount 18 from slide magazine 20 along slide track 22 (FIG. 2). As slide 18 is advanced, an insertion opening along edge 18*a* of slide 18 is opened up to permit insertion of a transparency into slide 18. The slide separator/out-of-slides inhibitor of the present invention forms a part of this third mechanism.

The Film Advance Mechanism

Lever 10 is pivotally connected to upstanding post 24 by universal link connection 26. Lever 10 has a first generally straight portion 10*a* to which handle 12 is connected at one end. At the opposite end of portion 10*a*, lever 10 has a downward turned portion 10*b*. Connecting link 26 is connected to portion 10*b*. Lever 10 has a third portion 10*c* which extends from downturned portion and is generally parallel to portion 10*a*. Portion 10*c* has a general C-shape. Post 24 extends through slot 28 in lower portion 10*c* of lever 10.

The film advance mechanism of the slide mounter of FIG. 1 is connected to and driven by lower portion 10*c* of lever 10. The film advance mechanism includes film advance pawl 30, which is movable along a path parallel to film track 16. Pawl 30 engages sprocket holes in film 14 to move film 14 along track 16.

The path of movement of film advance pawl 30 is defined by guide rods 32 and 34, which are parallel to one another and are supported at their ends by upstanding support members 36 and 38. Guide block assembly 40 is movable on guide rods 32 and 34. Film advance pawl 30 is connected to shaft 42, which is pivotally connected to guide block assembly 40. At one end of shaft 42 is pawl release lever 44, which permits the operator to turn shaft 42, and thereby move pawl 30 out of engagement with film 14. At the opposite end of shaft 42 is bias spring 46, which biases shaft 42 and pawl 30 to a normal position in engagement with sprocket holes in film 14.

As guide block assembly 40 is moved on guide rods 32 and 34, shaft 42 and film advance pawl 30 also are moved. Guide block assembly 40 is connected to lever 10 through arm 48 and connecting link 50.

The Knife Actuating Mechanism

The knife mechanism includes a pivoted knife blade 78, which cooperates with a fixed blade (not shown) to sever the film transparency from film web 14. Knife blade 78 is positioned at the end of film track 16, where film track 16 meets slide track 22. Lever 10 operates knife 78 through lever arm 10*d*, upstanding knife actuating lever 80, and knife actuating link 82. Knife actuation lever 80 is pivotally mounted about pivot axis 85 (by mounting means which are not shown), and is held in normal upstanding position shown in FIG. 1 by bias spring 86, which is connected near the lower end of knife actuation lever 80. Link 82 is connected at one end to the upper end of lever 80, and is connected at its opposite end to knife 78.

To cut the transparency from film web 14, lever 10 is moved downward from the home position. Arm 10*d* moves downward and engages roller 90, which is connected to lever 80. This causes lever 80 to pivot about pivot axis 85, with the upper end of lever 80 moving toward the forward portions of the slide mounter. As a result, link 82 drives knife 78 downward to sever the transparency from film strip 14. Knife 78 remains in the film cutting position until lever 10 and arm 10*d* move upward, so that roller 90 is no longer in engagement with arm 10*d*. At this point, bias spring 86 returns lever 80 to its normal position, and link 82 pivots knife 78 to its upward position.

The Slide Advance Mechanism

The slide advance mechanism which is shown in FIGS. 1–3 advances a slide mount 18 from the bottom of slide magazine 20 along slide track 22. Slide mounts 18 are oriented so that edge 18*a* which faces film track 16 contains the insertion opening of slide mount 18. Slide mounts 18 are preferably of the type which are a plastic unitary structure with a lid and a lower portion welded together, ready for use in a slide projector. Slide mounts 18 have an insertion slot along side 18*a* which is opened to receive the transparency.

As mount 18 is ejected from magazine 20 and advanced along slide track 22, edge 18*a* of the lower portion of mount 18 slides under a wedged ramp (not shown) and is bent downward. This creates an insertion slot between the lower portion and the lid allowing an opening ramp (not shown) to enter mount 18. As slide mount 18 moves forward along slide track 22, the opening ramp raises the lid, thereby opening the insertion slot sufficiently to permit the end of film 14 to be inserted into slide mount 18 without being scratched.

The slide mount advance mechanism includes actuator carriage 92, which moves along a path defined by guide rails 94 (one of which is shown in FIG. 2). The path defined by guide rails 94 is generally horizontal and perpendicular to the path defined by film track 16.

Mounting block 96 and slide pusher element 100 are connected by bolts 102 to carriage 92. As carriage 92 moves on rails 94, therefore, pusher element 100 moves along a path parallel to rails 94.

Actuator carriage 92 is linked to lever 10 through connection plate 104, universal connection link 106, and upstanding post 108. As handle 12 (and therefore lever 10) moves forward along its path toward magazine 20, carriage 92 is moved forward along rails 94 toward magazine 20. Pusher element 100 enters the lower portion of magazine 20 through rear opening 110 and pushes the lowermost slide 18′ of a lower stack of slides 111*a* within magazine 20 out through front exit opening 112 on the opposite side of magazine 20. Slide mount 18' moves out through front exit opening 112 into slide track 22, where it ejects a preceding slide which had been positioned in slide track 22 into a collecting basket (not shown).

As shown in detail in FIGS. 2 and 3, slide mounts 18 are stacked on arbor 114 (not shown in FIG. 1) which extends downward into the open upper end of magazine 20. Arbor 114 is supported at or near its top by an arbor support member (not shown).

The apparatus of the present invention includes a slide separator and out-of-slides lock mechanism which separates an upper stack of slides **111*b* on arbor 114 above a certain predetermined level from the lower stack of slides 111*a* which is below that level and is located within magazine 20**. In addition, the mechanism prevents further operation of the slide mounter when an "out-of-slides" condition is attained.

The slide separator/out-of-slides inhibitor mechanism includes arm assembly 116, which is pivotally mounted to magazine 20 by pivot pin 118. Screw 122 is mounted to and extends forward from portion **116*a* of arm 116. Screw 122 has a slide engaging head 124 which projects into magazine 20 through opening 126 at the upper end of magazine 20 and engages an edge of one or more slides mounts on arbor 114. When in its normal position, as shown in FIG. 2 in solid lines, head 124 holds slide 18" against arbor 114 and out-turned flange 20*a* of magazine 20, so that all slides above slide 18" on arbor 114 are held in stacked relation. This separates upper stack 111*b* of slides from lower stack 111*a* of slides (which is located within magazine 20 below separator head 124**).

The purpose of the slide separator is to limit the height of lower stack **111*a* of slides and thus limit the weight on lowermost slide 18' at the bottom of magazine 20. This permits pusher element 100 to be able to eject lowermost slide 18' with a predictable amount of force, regardless of the height of the upper stack 111*b* of slides on arbor 114**.

Extension spring 128 is connected between magazine 20 and upper portion **116*a* of arm 116, to bias arm 116 to a position in which head 124 engages slide 18". Arm 116 is pivoted from this normal position as lever 10 moves from the home position illustrated in solid lines in FIG. 3 toward magazine 20, thus driving carriage 92 and pusher element 100 forward to drive lowermost slide 18' out of magazine 20 and into slide track 22. Attached to carriage 92 is an upturned generally L-shaped flange 130. As carriage 92 is moved forward, flange 130 is also moved forward until it strikes roller 132 which is attached to rearwardly projecting portion 116*b* of arm 116. The force of flange 130 against roller 132 pivots arm assembly 116 about pivot pin 118, thereby moving head 124 out of engagement with slide 18" and permitting slide 18" to fall downward onto the lower stack 111*a* of slides positioned within magazine 20**.

As lever 10 continues its operating cycle, it begins moving rearwardly, thus extracting pusher element 100 from magazine 20. As flange 130 moves rearwardly as a result of the rearward movement of lever 10 (and carriage 92), spring 128 pivots arm assembly back toward its normal position, and head 124 again engages the bottom slide in upper stack **111*b***.

As lever 10 reaches the home position, pusher element 100 is returned to the position shown in FIG. 2, and the lower stack **111*a* of slides within magazine 20 moves downward by gravity so that a new lowermost slide 18' is in position to be ejected from magazine 20** during the next operating cycle.

As best shown in FIG. 2, adjusting screw 134 is connected to and projects forward from flange 130. The forwardmost end of screw 134 engages the rear wall of magazine 20 to limit the forward movement of carriage 92 and pusher element 100. By turning screw 134, and thus adjusting the projection of the end of screw 134 forward of flange 130, the forward limit of movement of pusher element 100 can be adjusted to provide the desired stroke for ejecting lowermost slide 18' from magazine 20.

The mechanism of the present invention further includes latching tab 136 and sawtooth latch 138, which provide an out-of-slides lock feature. Latching tab 136 extends outward from flange 130, while sawtooth latch 138 is located at the rear end of lower portion **116*a* of arm 116. Sawtooth latch 138 includes a ramp surface 140 and a shoulder 142 which, during normal operation, are out of the path of latching tab 136. When, however, there are no further slides to engage head 124, spring 128 pivots arm 116 about pivot pin 118, so that sawtooth latch 138 is in position to engage and hold latching tab 136. As carriage 92 is advanced forward, latching tab 136 is permitted to slide over ramp surface 140. As best shown in FIG. 3, when the operator attempts to move lever 10 back toward the home position, the back side of latching tab 136 engages shoulder 142, thereby preventing further rearward movement of lever 10**.

Once the out-of-slides lock is in operation, the further rearward movement of lever 10 is prevented. As a result, the operator cannot continue to operate the slide mounter. If this were permitted to happen (as in some prior art devices), the operator could continue to advance and cut film, even after all of the slides had been ejected from magazine 20. The present invention provides a convenient mechanism which both separates slides into upper and lower stacks **111*b* and 111*a***, repectively, and halts operation of the slide mounter before a total out-of-slides condition has occurred.

The operator can again initiate operation of the slide mounter after placing a new upper stack **111*b* of slides on arbor 114 so that head 124 comes in engagement with the side of slide 18". This moves sawtooth latch 138 out of the path of latching tab 136**.

Although the present invention has been described with reference to preferred embodiments, workers skilled in the art will recognize that changes may be made in form and detail without departing from the spirit and scope of the invention.

What is claimed is:

1. In apparatus for mounting a photographic film transparency into a slide frame of the type having a magazine for holding a plurality of slide mounts in stacked relationship and having slide ejector means movable along a path for ejecting a slide mount from the magazine into a slide track, the improvement comprising:

slide separator means for separating the plurality of slide mounts into an upper stack and a lower stack; and latch means operably linked to the slide separator means for preventing movement of the slide ejector means when no further slide mounts are in the upper stack.

2. The invention of claim 1 and further comprising:

arm means pivotally mounted with respect to the magazine for operably linking the slide separator means and the latch means.

3. The invention of claim 2 wherein the presence of slide mounts in the upper stack maintains the arm means in a position in which the latch means is maintained out of engagement with the slide ejector means, and wherein the absence of slide mounts in the upper stack causes the arm means to pivot to a position in which the latch means engages and holds the slide ejector means.

4. The invention of claim 2 wherein the slide separator means is carried by the arm means proximate a first end of the arm means, and wherein the latch means is carried by the arm means proximate a second end of the arm.

5. The invention of claim 4 wherein the first end is an upper end and the second end is a lower end, and wherein the arm means is pivotally mounted at a point between the upper and lower ends.

6. The invention of claim 5 wherein the arm means has a first normal position in which the slide separator means engages and holds a lowermost slide mount of the upper stack; a second position in which the slide separator means releases the lowermost slide mount of the upper stack to permit it to be stacked upon the lower stack; and a third position when no slide mounts are in the upper stack.

7. The invention of claim 6 wherein the slide ejector means comprises:

slide pusher means movable along the path to enter the magazine through an entrance opening and push a slide mount out of the magazine through an exit opening; and latch engaging means movable with the slide pusher means for engagement with the latch means when the arm means is in the third position.

8. The invention of claim 7 wherein the slide ejector means further comprises:

arm pivoting means movable with the slide pusher means for pivoting the arm means from the first to the second position.

9. The invention of claim 8 and further comprising:

bias means for causing the arm means to tend to pivot from the second position toward the first position and from the first position toward the third position.

10. The invention of claim 9 wherein during a normal operating cycle the slide pusher means moves forward into the magazine to eject a slide from the magazine, and moves rearward to retract from the magazine.

11. The invention of claim 8 wherein the latch means is positioned out of a path of the latch engaging means when the arm means is in the first and second positions, and wherein the bias means, when no slides are present in the upper stack causes the arm means to pivot to the third position in which the latch means is in a position to engage and hold the latch engaging means.

12. The invention of claim 10 wherein the latch means comprises a sawtooth latch having a ramp surface and a shoulder, the ramp surface permitting the latch engaging means to move forward as the slide pusher means moves forward, and wherein the shoulder engages the latch engaging means to prevent rearward movement of the latch engaging means and the slide pusher means when the arm means is in the third position.

13. The invention of claim 12 wherein the arm pivoting means comprises a generally upstanding flange connected to the slide pusher means, and wherein the arm means includes flange engaging means extending from the lower end of the arm means to engage the flange as the slide pusher means moves forward.

14. The invention of claim 13 wherein the flange engaging means comprises a flange engaging roller connected to and extending outward from the lower end of the arm means.

15. The invention of claim 13 wherein the latch engaging means comprises a latching tab projecting outward from the upstanding flange.

* * * * *